T. A. EDISON.
SHAFT COUPLING.
APPLICATION FILED SEPT. 13, 1906.

923,633.

Patented June 1, 1909.

Witnesses:
Frank D. Lewis
Delos Holden

Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY.

SHAFT-COUPLING.

No. 923,633.  Specification of Letters Patent.  Patented June 1, 1909.

Application filed September 13, 1906. Serial No. 334,412.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Shaft-Couplings, of which the following is a description.

My invention relates to shaft couplings and has been designed more particularly for use with heavy shafting where the power transmitted is of great magnitude, as for example in the driving of rolls used in the crushing of Portland cement clinker, and my invention has for its object the production of a simple form of coupling, easy to manufacture and possessing ample strength for the purposes required.

Figure 1:
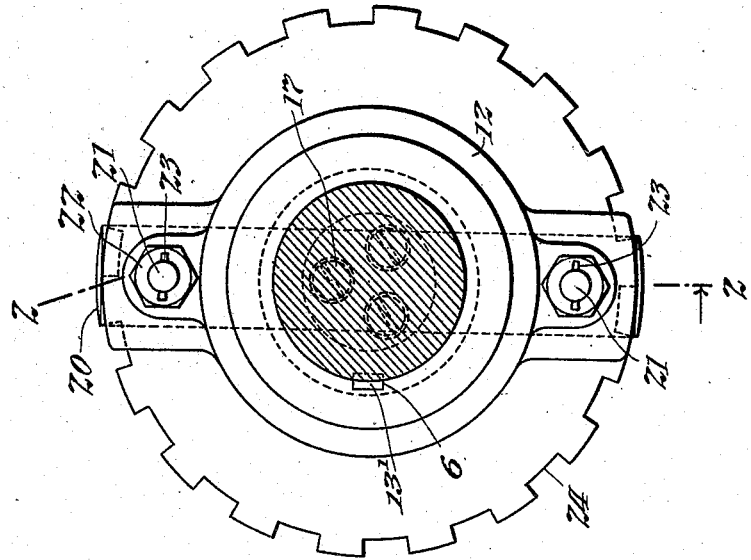
Figure 2:
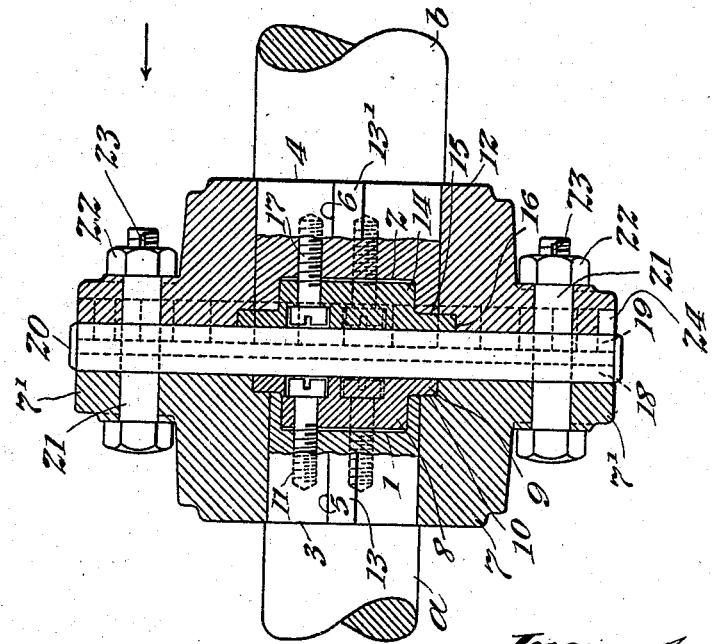

Referring to the accompanying drawing, Figure 1 is a side elevation of a coupling constructed in accordance with my invention; Fig. 2 is a section on line 2—2 of Fig. 1.

In both views corresponding parts are designated by the same reference characters.

In Fig. 2, *a* represents a drive shaft and *b* the shaft which is to be coupled thereto. The end of the shaft *a* is formed with a recess 1 and the end of the shaft *b* with a similar recess 2. The end of each shaft is reduced in diameter, forming shoulders 3 and 4 respectively. Each shaft is also provided with a keyway, 5 and 6 respectively. Upon the reduced portion of the shaft *a* is placed a collar 7 having radial arms 7' and being provided with a keyway which comes opposite the keyway 5 and receives a key 13. The collar 7 is held against the shoulder 3 by a clamp 8 formed with a central portion adapted to fit within the hollow end of the shaft *a* and a flange 9 which occupies a corresponding recess 10 formed in the inner face of the collar 7. The clamp 8 is drawn into clamping position by bolts 11 which are countersunk in said clamp and threaded in the end of shaft *a*. Upon the shaft *b* is a collar or disk 12 which is keyed thereto by a key 13'. This collar is held against the shoulder 4 of the shaft *b* by a clamp 14 having a central portion fitted within the end of the shaft *b* and a flange 15 which occupies the recess 16 of the collar 12, said clamp being similar in all respects to the clamp 8 previously described, and being drawn into clamping position by holding bolts 17. The inner face of the collar 7 is milled across to form a keyway 18 and the inner face of the collar 12 is provided with a similar keyway 19.

When the coupling is formed the collars 7 and 12 are brought into the positions shown in the drawing so that the keyways 18 and 19 are opposite each other, and a key 20 is then inserted, this key extending entirely across the coupling and covering the heads of the bolts 11 and 17. The members 7, 12 and 20 are then bound firmly together by bolts 21 which pass through the same and receive upon their ends nuts 22 secured by cotter pins 23. For convenience in turning, the periphery of the disk 12 is preferably formed with notches 24.

Having now described my invention, what I claim as new and desire to secure by Letters Patent is as follows:

1. In a shaft coupling, two shafts each having a reduced shouldered end, collars on said ends, clamps having flanges countersunk within said collars and adapted to hold said collars against the shoulders of said shafts, screws or bolts threaded into said shafts for drawing the clamps into clamping position, the collars being provided with registering key-ways, and a transverse key in said ways, substantially as set forth.

2. In a shaft coupling, the combination of a shaft having a reduced shouldered end, a collar mounted on said end, a clamp having a flange in engagement with said collar and adapted to hold said collar against the shoulder of said shaft, and a screw or bolt countersunk in said clamp and threaded longitudinally in said shaft for drawing the clamp into clamping position, substantially as set forth.

3. In a shaft coupling, the combination of the two shafts having reduced shouldered ends, collars mounted upon each of said ends, flanged clamps for pressing said collars against said shoulders, a plurality of bolts or screws for drawing each of said clamps into clamping position, and a transverse key for transmitting the shearing stress from one collar to the other, said key covering the heads of said bolts, substantially as set forth.

4. In a shaft coupling, the combination of a shaft having a reduced shouldered end, a collar mounted on said end, a clamp having a flange countersunk in said collar and adapted to hold said collar against the shoulder of said shaft, and a screw or bolt threaded longitudinally in said shaft countersunk within the clamp for drawing said clamp into clamping position, substantially as set forth.

5. In a shaft coupling, the combination of a shouldered shaft, a collar on said shaft, a clamp for holding said collar against said shaft, said clamp being countersunk within the end of said shaft, substantially as set forth.

6. In a shaft coupling, the combination of a shouldered shaft, a collar on said shaft, a clamp for holding said collar against said shaft, said clamp being countersunk within the end of said shaft and having a flange countersunk in said collar, substantially as set forth.

7. In a shaft coupling, the combination with the two shafts having reduced shouldered ends, of collars placed upon each of said ends, means for clamping said collars against said shoulders, and a key extending transversely to said shafts and occupying a keyway formed in each of said collars, said clamping means being countersunk within said collars below the bottoms of said keyways substantially as set forth.

This specification signed and witnessed this 11th day of Sept. 1906.

THOMAS A. EDISON.

Witnesses:
FRANK L. DYER,
ANNA R. KLEHM.